United States Patent [19]

Tick et al.

[11] Patent Number: 5,278,107
[45] Date of Patent: Jan. 11, 1994

[54] OPTICAL PARTS AND EQUIPMENT USING INFRARED ATHERMAL GLASSES

[75] Inventors: Paul A. Tick, Corning, N.Y.; Seiko Mitachi, Geneva, Switzerland

[73] Assignee: Corning Incorporated, Corning, N.Y.

[21] Appl. No.: 800,917

[22] Filed: Nov. 27, 1991

[51] Int. Cl.[5] .............................................. C03C 3/32
[52] U.S. Cl. ........................................ 501/40; 501/43
[58] Field of Search ................................... 501/40, 43

[56] References Cited

U.S. PATENT DOCUMENTS

| | | |
|---|---|---|
| 4,537,864 | 8/1985 | Tick . |
| 4,752,593 | 6/1988 | Tick . |
| 5,015,281 | 5/1991 | Hau et al. ............................ 501/40 |
| 5,081,076 | 1/1992 | Rapp .................................. 65/32.5 |

OTHER PUBLICATIONS

"Athermal Glass for the Infrared", Seiko Mitachi and Paul A. Tick; Applied Optics, Apr. 1, 1991, vol. 30, No. 10, pp. 1285–1289.
"Thermal Coefficient of Refractive Index of Optical Glasses", Tryggve Baak; Journal of the Optical Society of America, vol. 59, No. 7, pp. 851–857, Jul. 1969.
"Effect of Temperature Gradients on the Wave Aberration in Athermal Optical Glasses", F. Reitmayer and H. Schroeder; Applied Optics, vol. 14, No. 3, pp. 716–720, Mar. 1975.
"Dispersion Measurement on Fluoride Glasses and Fibers", S. Mitachi; Journal of Lightwave Technology, vol. 7, No. 8, Aug. 1989, pp. 1256–1263.

*Primary Examiner*—Karl Group
*Assistant Examiner*—A. Wright
*Attorney, Agent, or Firm*—K. McNeill Taylor, Jr.

[57] ABSTRACT

Optical parts and optical equipment, including lenses, mirrors and laser media made of athermal glasses having compositions comprising 0–13 mol % CdO, 9–24 mol % $CdF_2$, 5–10 mol % LiF, 30–34.5 mol % $AlF_3$, 28–33.5 mol % $PbF_2$, 0–4 mol % KF, 0–6.5 mol % $YF_3$, and 0–2 mol % $LaF_3$ and having little or no optical path length change as a function of temperature in the infrared region of 1 $\mu$m to 5 $\mu$m.

4 Claims, 8 Drawing Sheets

OPTICAL PARTS AND EQUIPMENT USING INFRARED ATHERMAL GLASSES

BACKGROUND OF THE INVENTION

The present invention is related to glasses for infrared applications, especially infrared athermal fluoride glasses whose optical path length change as a function of temperature change will become practically zero especially in the infrared region of 1 to 5.5 μm, and optical parts as well as optical equipment utilizing these glasses.

In performing precise optical measurements, generally, the problem is that there is an optical system variation due to temperature change. As a typical example, the optical system may comprise a camera, especially camera lenses, for example, on board a space satellite, where a large temperature difference will occur between the portion irradiated by the sun light and the shaded portion. When a temperature difference occurs in a lens, it will appear as heterogeneity in refractive index and cause disorder in the image, and it MAY detrimentally affect the resolution capability of the camera—this has been observed in the past. Generally, the refractive indices of oxide system glasses rise with the rise in temperature. The temperature coefficient of refractive index, dn/dT is of the order of $+10$ to $+2 \times 10^{-6}/°$ C. (Tryggve Baak, J. Opt. Soc. Am., 59 (1969) 851).

In conjunction with the refractive index change, there is a linear expansion coefficient problem which will appear as a thickness change in the optical system. Although the linear expansion coefficient of quartz (silica) is very small, $5 \times 10^{-7}/°$ C., it exhibits a large dn/dT value of $+10 \times 10^{-6}/°$ C. Because of this, attempts have been made to find a special oxide glass system to make the temperature coefficient of the refractive index, dn/dT, zero, and to account for both the refractive index temperature change and expansion. The development of athermal glass, whose optical path length temperature change, ds/dT, is zero, has been attempted by developing special oxide glasses (F. Reitmayer and H. Schroeder, Appl. Opt., 14 (1975) 716). However, these are based on interference methods utilizing a visible laser light; thus they are athermal glasses in the visible region. So far no report has been published on athermal glasses at wavelengths longer than 1 μm, which would be important for infrared cameras, etc.

Of course, the infrared transparency of metal fluoride glasses has long been recognized, and efforts have been made to develop stable fluoride glasses to exploit this transparency. U.S. Pat. Nos. 4,537,864 and 4,752,593, for example, report stabilized Cd—Li—Al—Pb—F glasses with excellent transparency in the 2-6 micron wavelength range.

Little attention has been given, however, to the thermal properties of halide glasses in the infrared regime. Thus the values of dn/dT and ds/dT of fluoride glasses, have been reported only for $ZrF_4$ system glasses. These values of dn/dT and $ds/dT_{abs}$ are, respectively, $-11 \times 10^{-6}/°$ C. and $-2.2 \times 10^{-6}/°$ C. (for $ZrF_4$—$BaF_2$—$GdF_3$—$AlF_3$); and for the $AlF_3$ system glass example, dn/dT and $ds/dT_{abs}$ are $-6.7 \times 10^{-6}/°$ C. and Technology, Vol. 7, No. 8 (1989) p. 1256. These numbers do not suggest that fluoride glasses would be superior infrared athermal glasses, consequently, no report has been published on optical systems and optical parts constructed of athermal glasses operating in the infrared region.

Furthermore, athermal glasses are effective as laser media where the laser medium refractive index temperature change due to heat generation during laser oscillation and the optical path length change present problems for the stability of the laser oscillation mode. In recent years, oxide glasses and fluoride glasses are being developed as media for Er, Nd, etc. lasers which oscillate at wavelengths longer than 1 μm; however, presently, there has been no use of athermal glass as a laser medium at wavelength longer than 1 μm.

As described above, the realization of infrared athermal glasses which will not generate optical path length difference in the infrared region and the realization of optical parts and optical equipment utilizing these glasses are strongly desired.

The objective of the present invention is to provide new glass compositions which do not change optical path length as a function of temperature change in the 1-5.5 μm band. Furthermore, by using these glasses as lens or laser media for incorporation into optical parts, it is an aspect of the present invention to provide infrared optical equipment or optical parts which will not suffer degraded resolution capability due to temperature change in the infrared region and which will not increase in instability during laser performance.

SUMMARY OF THE INVENTION

The optical parts and optical equipment based on the present invention are constructed of lenses, mirrors or laser media made of athermal glasses having compositions comprising 0-13 mol % CdO, 9-24 mol % $CdF_2$, 5-10 mol % LiF, 30-34.5 mol % $AlF_3$, 28-33.5 mol % $PbF_2$, 0-4 mol % KF, 0-6.5 mol % $YF_3$, and 0-2 mol % $LaF_3$.

In contrast to the conventional technology focusing on the visible region, in the present invention, glass compositions which will have no optical path length change as a function of temperature change in the infrared region of 1 μm to 5 μm are provided. Furthermore, equipment utilizing optical parts constructed of these glasses is provided. According to the present invention, an infrared image tube which is resistive to image variation due to temperature change, an infrared binocular, an infrared microscope superior in resolution and stability, and a principal focus correction optical system for infrared telescopes can be constructed. In addition, if the laser medium which is exposed to severe temperature change or the etalon and/or partial transmitting mirror inside the resonator are constructed by using the infrared athermal glasses of the present invention, a laser with excellent thermal stability can be achieved.

DETAILED DESCRIPTION OF THE INVENTION

The present invention is illustrated in detail below by reference to the performance examples.

EXAMPLE 1

A total of 50 g comprising the glass constituents shown in Table 1 below were weighed and melted in a platinum crucible at 950° C. for 15 minutes. The melt was then cast in a mold and annealed at 260° C. for 1 hour. It was then cut into prism shape. Each face of the prism was ground-polished and the prism was used as a sample for the measurements set forth below.

TABLE 1

| Glass Number | Glass Composition (Mol %) |
|---|---|
| CLAP | $13CdO—9CdF_2—10LiF—34.5AlF_3—33.5PbF_2$ |
| CLAP-K-Y-(1) | $24CdF_2—5LiF—32.5AlF_3—28PbF_2—4K—6.5YF_3$ |
| CLAP-K-Y-(2) | $10CdO—14CdF_2—5LiF—30AlF_3—30.5PbF_2—4KF—6.5YF_3$ |
| CLAP-K-Y-La | $12CdO—12CdF_2—6LiF—30AlF_3—30PbF_2—4KF—4YF_3—2LaF_3$ |

Figure 1:
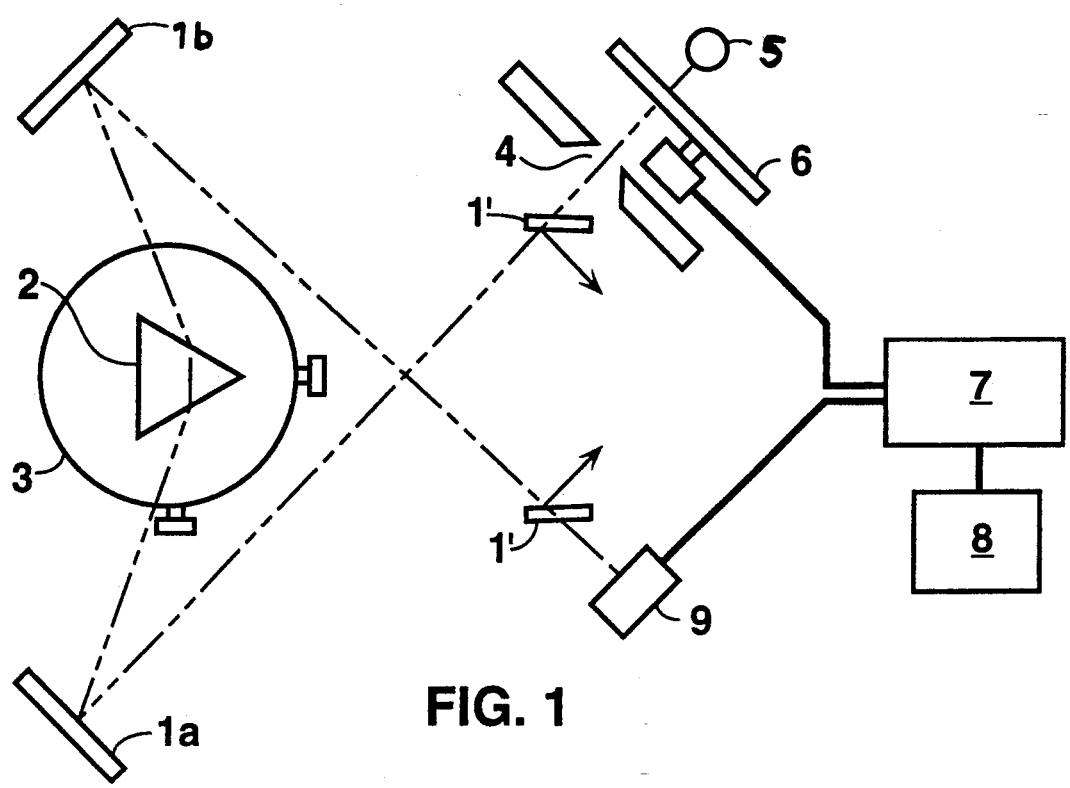
FIG. 1 is a diagram of a UV-IR region refractive index measurement system.

These four kinds of prism samples were employed in conjunction with the ultra violet-infrared region refractive index dispersion measurement equipment constructed by the optical system shown in FIG. 1 to measure the refractive indexes at 30 wavelengths shown in Table 2 through Table 5, in the wavelength range from 0.4 to 5.3 μm by using the minimum deviation method. In this arrangement the aforementioned glass prism sample 2 was placed on the rotation stage 3, shown in FIG. 1 the light source 5 (Hg, He, $CO_2$ bright line spectra or the combination of Pt light source and the absorption lines of polystyrene & trichlorobenzene, TCB) was chopped using the chopper 6, passed through slit 4, reflected by mirror 1a and the light was refracted by sample 2; and the minimum deflection position was measured using the InSb light receiver 9 which received the refracted light from mirror 1b. In this case, the lock-in amplifier 7, in synchronization with chopper 6, is employed to amplify the output of light receiver 9, and the measured results are recorded using recorder 8. Mirrors 1' were used for auto-collimation in obtaining the prism angle.

Figure 2:
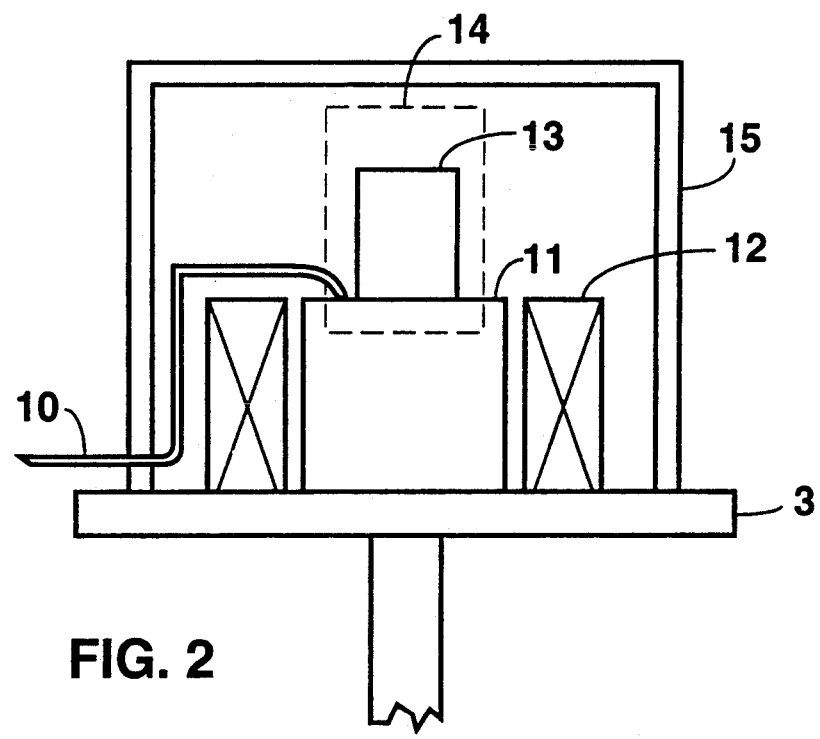
FIG. 2 depicts in cross-section a variable temperature sample testing chamber.
Figure 3:
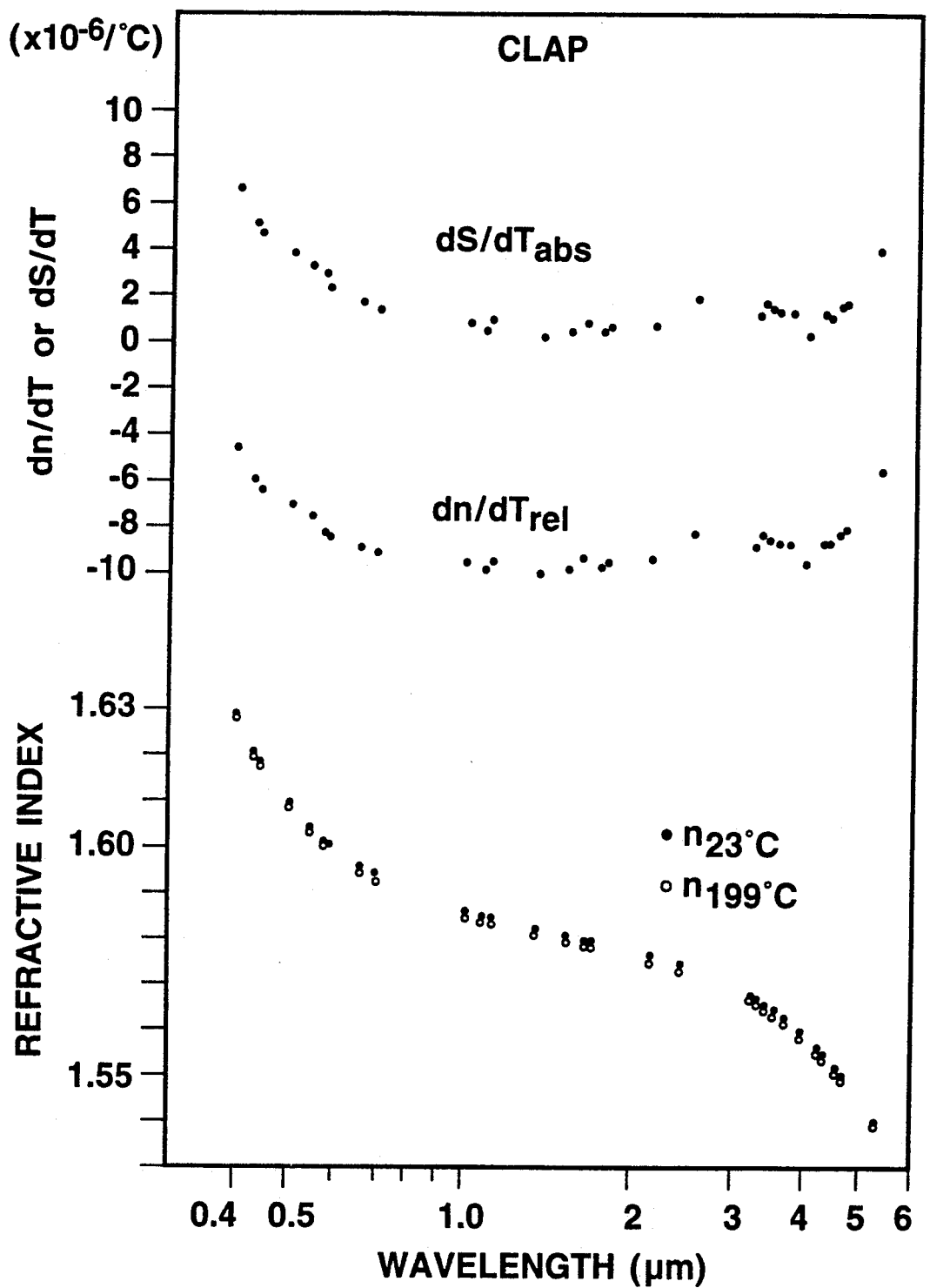
FIG. 3 through FIG. 6 are graphs of Wavelength dependency of refractive index n, refractive index temperature coefficient $dn/dT_{rel.}$, optical path length temperature change $dS/dT_{abs}$, for the four glasses set forth in Table 1.
Figure 4:
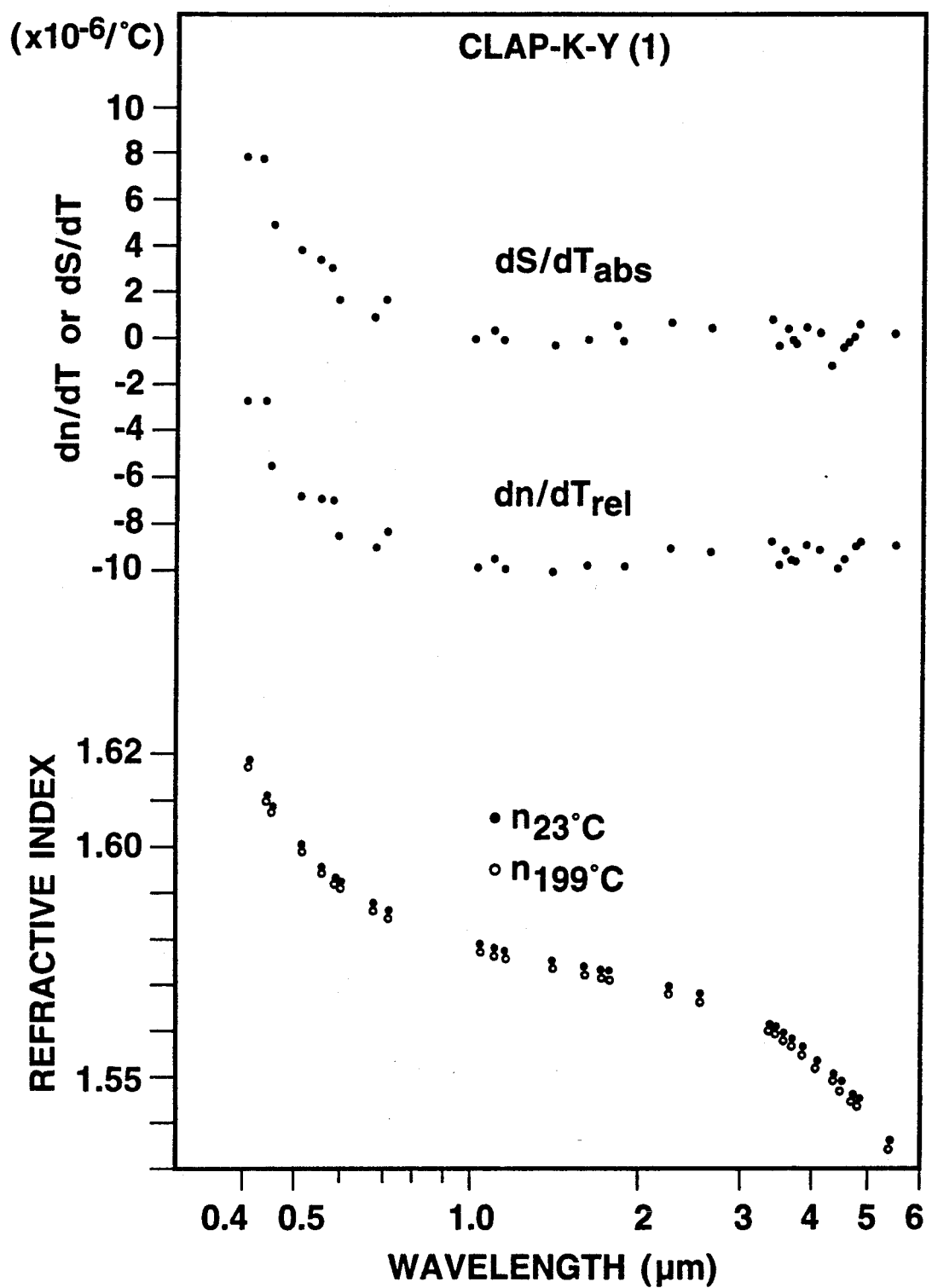
Figure 5:
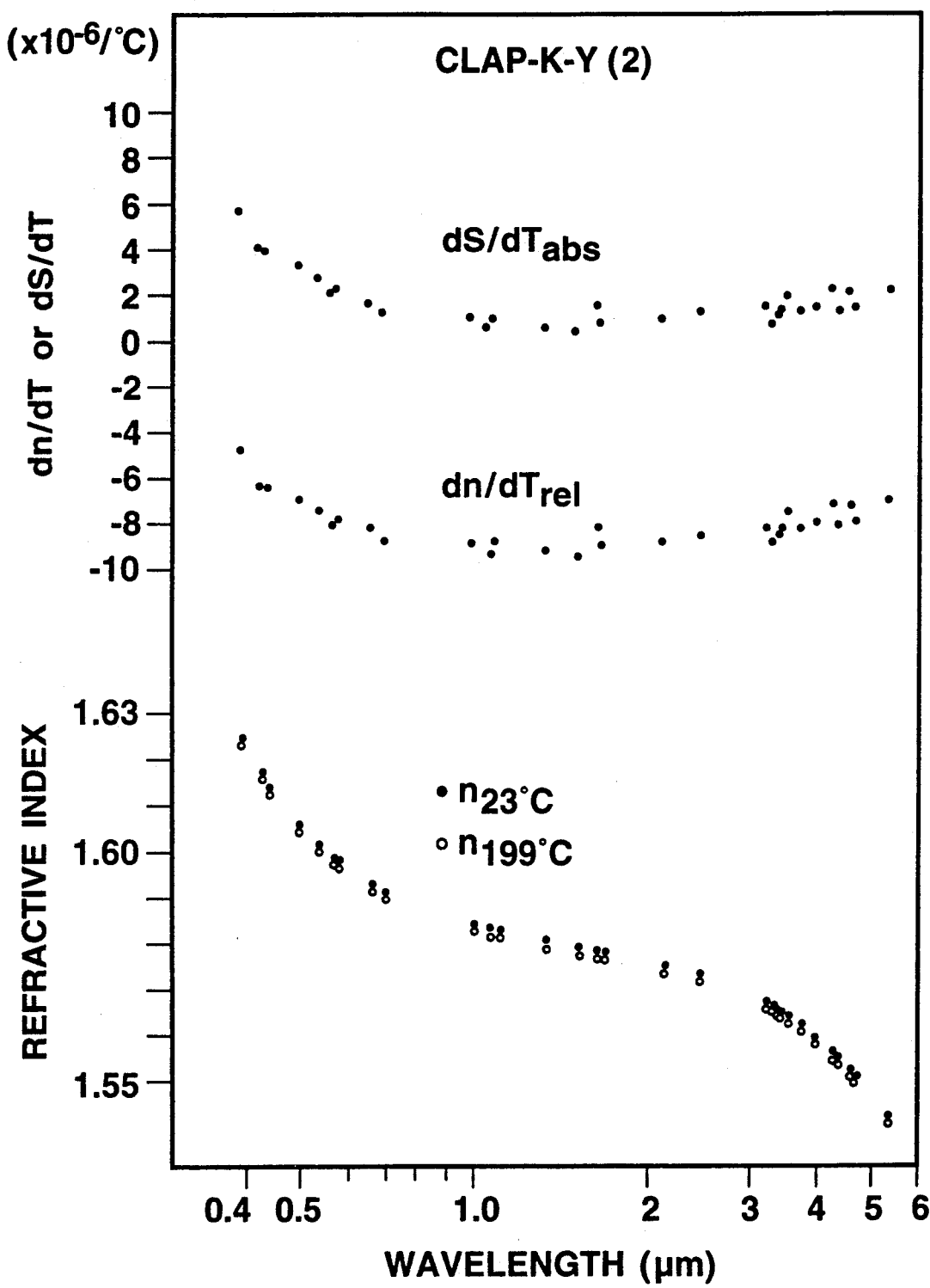

The refractive index data calculated from the prism angle and the minimum deviation at the aforement various wavelengths for the four kinds of glass shown in Table 1 are given in Table 2 through Table 5. Using the temperature changeable sample stage as shown in FIG. 2, the temperature dependency of refractive index was measured. The sample prism 13 was placed on the brass platform 11; the temperature was measured using thermocouple 10 and the measured data was fed back to the electric source of heater 12 to control the temperature of prism sample 13 within +/−1° C. for the temperature range employed, from room temperature to 200° C. In this situation, by using quartz (silica) glass cover 15, the temperature difference between the bottom portion and top portion of the sample prism 13 was controlled within 4° C. The light for measurement was introduced from slit 14 to measure the refractive indices using the above mentioned minimum deviation method at thirty (30) wavelengths for temperatures up to about 200° C. from room temperature, as shown in Table 2 through Table 5. Based on the results, the refractive index temperature change coefficients in air, $dn/dT_{rel.}$, were obtained according to the equation below:

$$dn/dT_{rel.} = (n_{T1} - n_{T2})T_1 - T_2/ \qquad (1)$$

Where $T_1$ and $T_2$ denote measurement temperature and $n_{T1}$ and $n_{T2}$ are the refractive indices at the above temperatures, respectively.

Next, the temperature coefficients of refractive index in vacuum are expressed by the equation below using the refractive index of the glass, n, the temperature dependency of refractive index in air, $dn_{air}/dT$ ($= -9.74 \times 10^{-7}/°$ C.) and the refractive index of air, $n_{air}$ ($= 1.00027728$).

$$dn/dT_{abs} = n_{air} \, dn/dT_{rel.} + n(dn_{air}//dT) \qquad (2)$$

The results are shown in Table 2 and Table 3. Further, the optical path length temperature change, dS/dT which is important for optical design, is obtained by the equation below using the relation to linear thermal expansion coefficients.

$$dS/dT = dn/dT_{abs} + a(n-1) \qquad (3)$$

Figure 6:
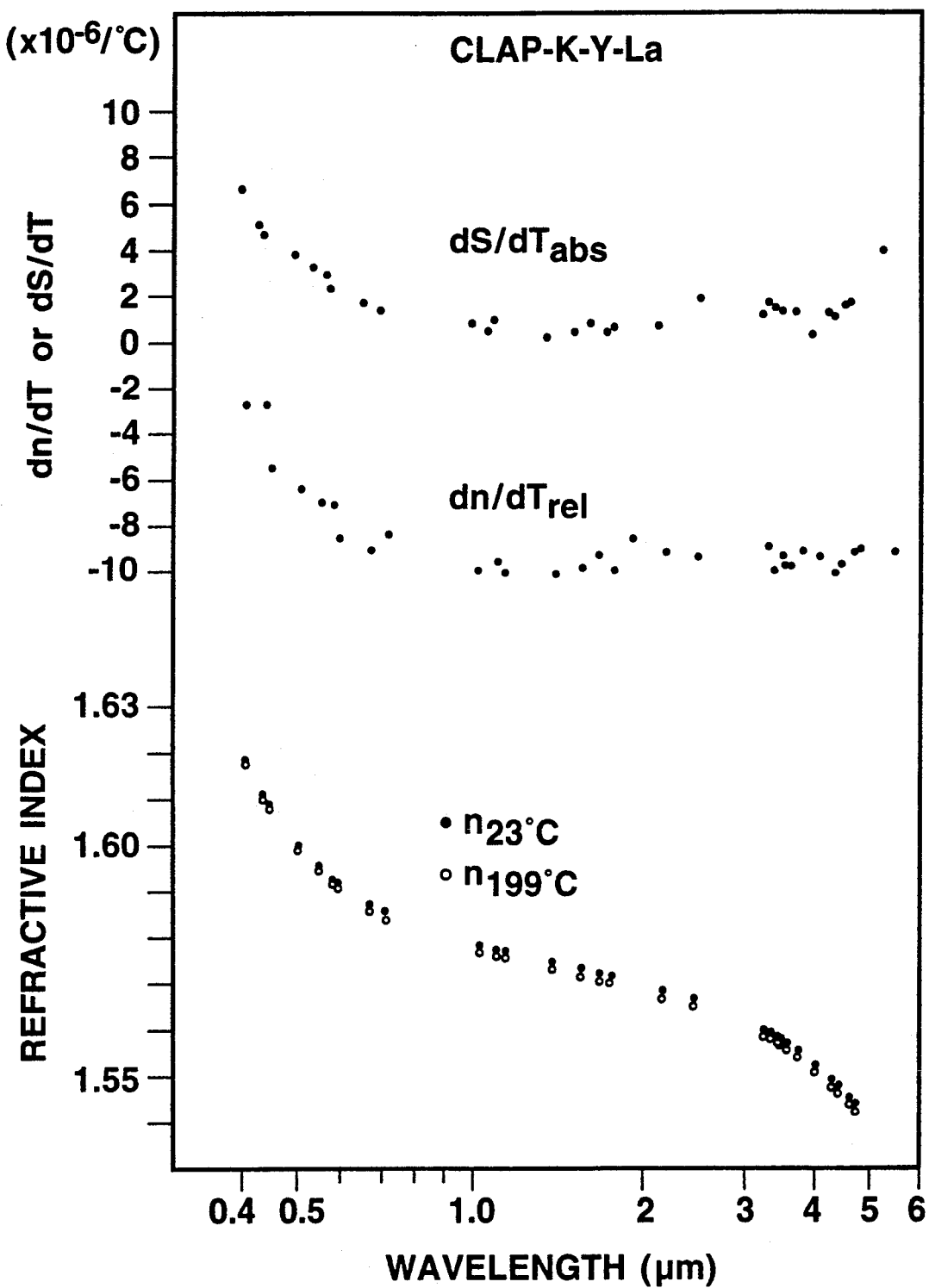

Glass rods of each composition shown in Table 1 were prepared and their linear expansion coefficients were measured and the light path length temperature changes were obtained from equation (3). These results are also shown in Table 2 through Table 5. Based on these obtained results, the drawn results shown in FIG. 3 through FIG. 6 were obtained. One thing in common from FIG. 3 through FIG. 6 is that accompanying the rise in temperature, the refractive index decreased; in 0.4 to 5.5 μm range, $dn/dT_{rel}$ was in the range from −3 to $−10 \times 10^{-6}/°$ C. Meanwhile, the optical path temperature change, $dS/dT_{abs}$ was close to zero at wavelength longer than 1 μm. This phenomenon was especially pronounced for the respective wavelengths of various glasses as follows:

1 to 2.4 μm for CLAP (cf. FIG. 3); 1 to 5.3 μm for CLAP-K-Y(1) (cf. FIG. 4); 1 to 2 μm for CLAP-K-Y-(2) (cf. FIG. 5); and 2.1 to 4.6 μm for CLAP-K-Y-La (cf. FIG. 6). It was especially pronounced in CLAP-K-Y(1) shown in FIG. 4.

Namely, in the range from 1 μm to 5.3 μm, the optical path length of this particular family of fluoride glasses would not vary due to temperature change. These are the so called athermal glasses in which no image flickering (variation due to thermal aberration) will occur as a function of temperature change. The characteristics of these CLAP system glasses are such that they are athermal glasses in the infrared region of 5.5 μm—an important characteristic that has not been achieved in the past.

Four infrared athermal glass compositions were shown in Table 1; and the characteristics of these infrared athermal glasses were given in Table 2 through Table 5 and FIG. 3 through FIG. 6. The compositions of the infrared athermal glasses of the present invention are in the ranges as follows: 0–13 mol % CdO, 9–24 mol % $CdF_2$, 5–10 mol % LiF, 30–34.5 mol % $AlF_3$, 28–33.5 mol % $PbF_2$, 0–4 mol % KF, 0–6.5 mol % $YF_3$, and 0–2 mol % $LaF_3$.

EXAMPLE 2

Figure 7:
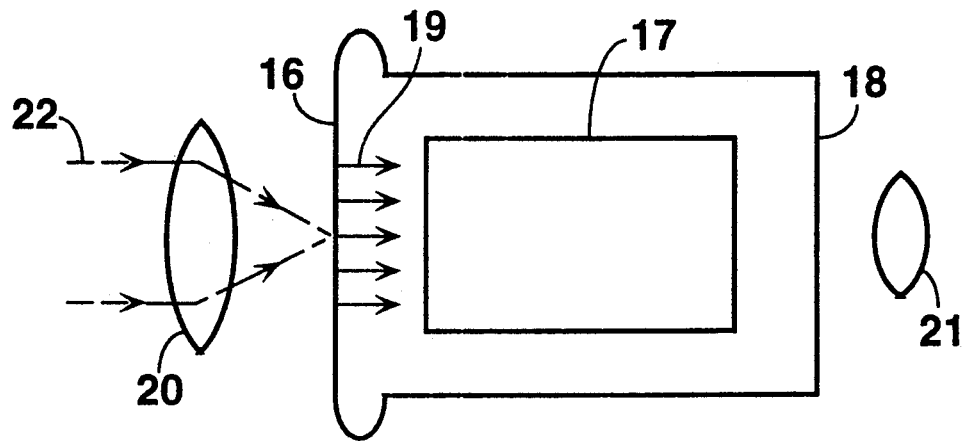
FIG. 7 is a cross section diagram of an infrared image tube construction in accordance with the present invention.

FIG. 7 shows an example of the structure of infrared image tube of the present invention. In this infrared image tube, a lens prepared using the athermal glass shown in Performance Example 1 is employed as object lens 20. The incident infrared light 22 is focused on the photoelectric cathode by the infrared athermal object lens 20; and the photoelectrons 19 emitted by the infrared light are accelerated by electron accelerator 17 and converged on the fluorescence body coated anode 18. This visible fluorescent optical image can be observed by the eye piece 21 as visible image. Since the lens made of the athermal glass in Performance Example 1 is used for the object lens 20, whose temperature is substantially raised by the incident light, the image tube performance, especially the image variation by the temperature change of the object lens, is greatly improved. When the aforementioned CLAP-K-Y-(1) is used for the object lens, the infrared images are especially stable in a wide range of wavelengths from 1 to 5.3 μm.

EXAMPLE 3

Figure 8:
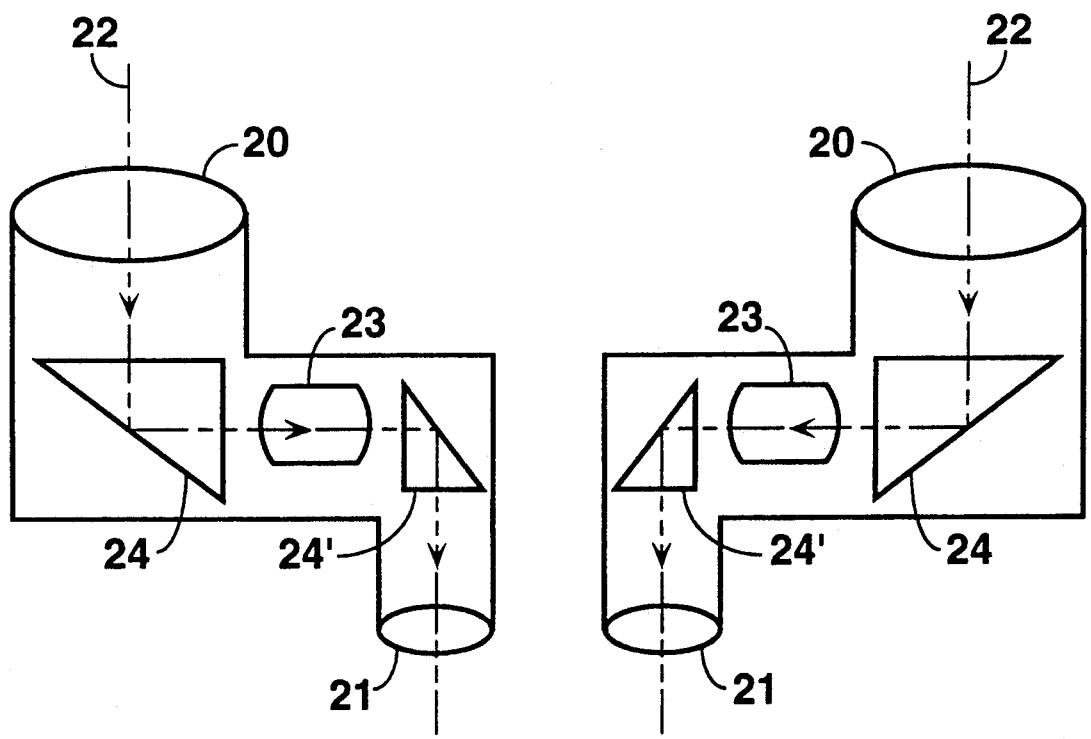
FIG. 8 is a cross section diagram of an infrared binocular construction in accordance with the present invention.

FIG. 8 shows an example of the construction of infrared binoculars according to the present invention. The incident infrared light 22 is condensed on the infrared image tube 23 by the infrared region athermal object lens 20 and the prism 24, and it is converted to a visible image. This visible image is then observed by the prism 24' and the eyepiece 21. Similar to Performance Example 2, an infrared binocular which limits image variation (thermal aberration) due to temperature change was constructed by using the athermal glass shown in Performance Example 1 for the object lens 20. Preferably, by using the aforementioned athermal glass CLAP-K-Y-(1), a infrared binocular with good performance over a wide range of wavelengths can be obtained.

EXAMPLE 4

Figure 9:
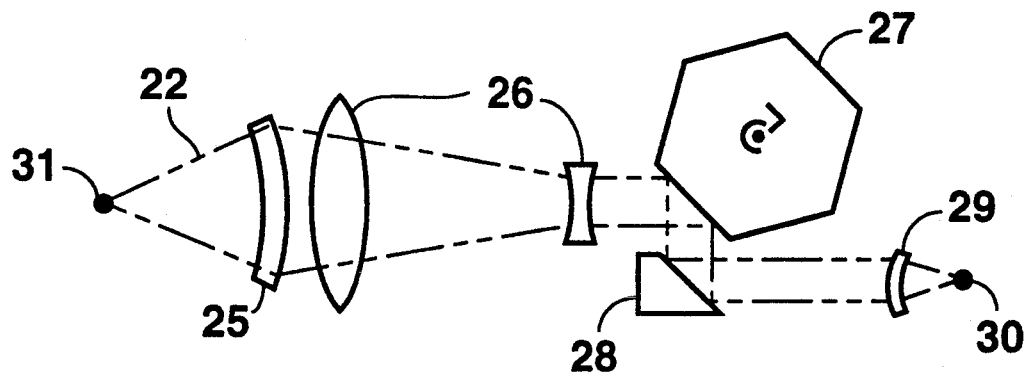
FIG. 9 is a cross section diagram of an infrared microscope construction in accordance with the present invention.

FIG. 9 shows an example of the construction of an infrared microscope according to the present invention. The incident infrared light 22 from the object 31 is enlarged by the infrared athermal contact-copying lens 25 and the infrared athermal enlarger lens 26, and scanned in vertical and horizontal directions by the rotating polygonal mirror 27 and vibrating mirror 28. It is then focused and detected on the detecting element 30 by the infrared athermal image photographing lens 29. As described above, by using the athermal glass of the Performance Example 1 for the entire lens system, an infrared microscope was constructed which limited the image disturbance as a function of temperature change. For example, it is preferable to employ the athermal glass CLAP-K-Y-La for the lens system in the infrared microscope to be used for wavelength region from 2.5 to 4.5 μm.

EXAMPLE 5

Figure 10:
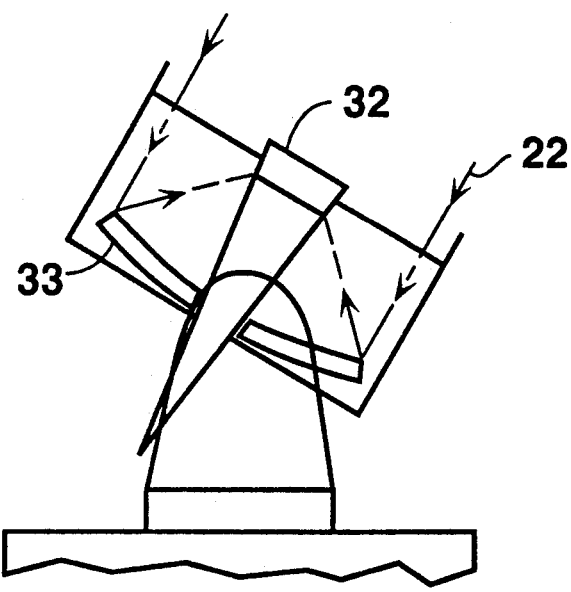
FIG. 10 depicts an astronomical infrared telescope.
Figure 11:
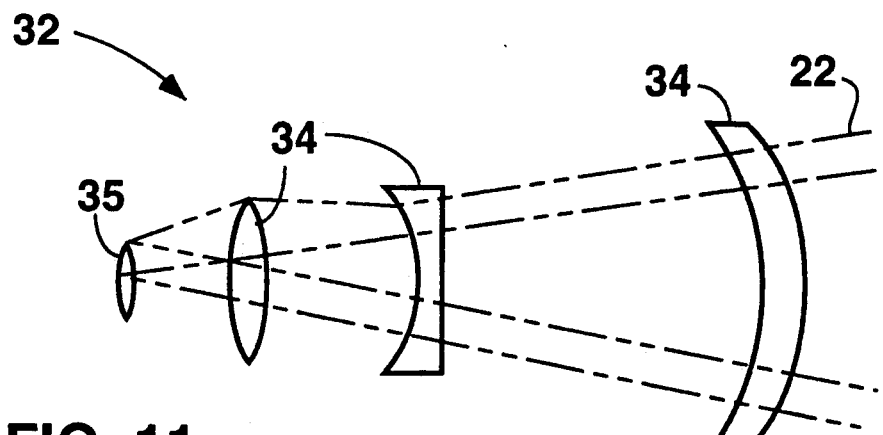
FIG. 11 depicts a principal focus correction lens system for an astronomical telescope in accordance with the present invention.

As shown generally in FIG. 10, a concave surface mirror 33 and a focus correction lens system of principal focus, 32, are incorporated into the astronomical telescope. This principal focus correction lens system is composed, as shown in FIG. 11, by a plural number of lenses, 34 and mirror, 35.

In the present invention, depending on the infrared wavelength region to be observed, the most suitable composition glasses from the infrared athermal glasses described in Performance Example 1 are selected for the plural number of lenses 34, individually. As a result, an extremely high precision resolution would be required and therefore, the image flickering (deviation) problem due to heterogeneous temperature distribution (a frequent problem in astronomical infrared telescopes) is drastically reduced. The infrared telescope of the present invention is useful in an environment where a temperature change often occurs due to sunlight, such as in space.

EXAMPLE 6

Figure 12:
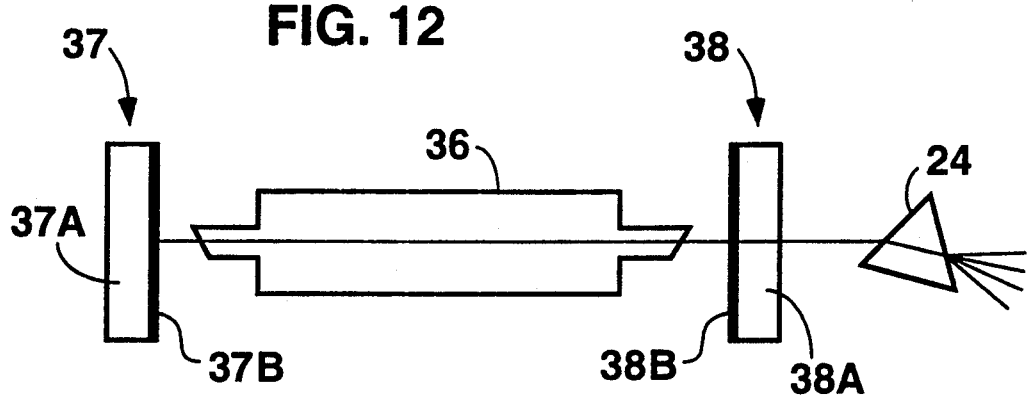
FIG. 12 and FIG. 13 are cross section diagrams of Ar Laser resonators in accordance with the present invention.
Figure 13:
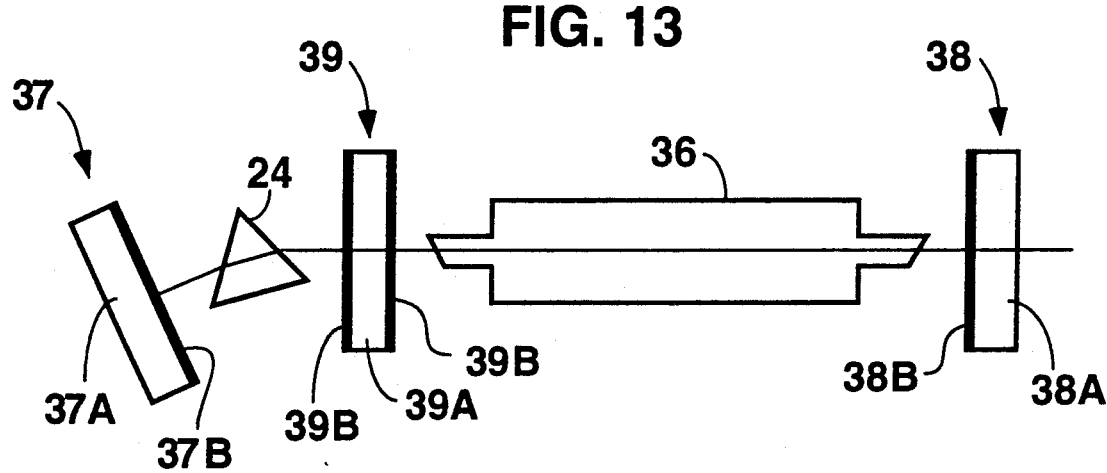

FIG. 12 and FIG. 13 show examples of Ar Laser resonator construction. Generally, in the structure of FIG. 12, the resonator is constructed by arranging the high reflectance efficiency mirror 37 provided with reflectance film 37B on the surface of the glass 37A, and the partial reflectance mirror 38, on either side of discharge tube 36. Partial reflectance mirror 38 is provided with high hardness, suitable for high energy laser application, by oxide system coating 38B on the surface of glass 38A. Using a plural number of oscillation lines, simultaneous oscillation is performed and then the light is dispersed by the outside prism 24. Meanwhile, as shown in FIG. 13, If the prism 24 and etalon 39 are combined with non-reflecting coatings 39B on both surfaces of glass 39A and placed inside the resonator, one wavelength single mode oscillation can be achieved.

In the present invention, the infrared athermal glasses described in Example 1 are used to construct the partially transmitting mirror 38 in FIG. 12 and the partial transmitting by mirror 38 and etalon 39 in FIG. 13. It is preferable to employ infrared athermal glass CLAP-K-Y-(1). By using the athermal glasses of the present invention for the partially transmitting mirrors and etalon, the output stability at the laser resonator shown in FIG. 12 is greatly improved. For the resonator shown in FIG. 13, in addition to the output stability improvement, the construction of an Ar laser without mode hopping is achieved. As described above, the glasses of the present invention shown in Example 1 are well suited for the construction of resonators that are stable against the temperature changes caused by the heat generated in laser oscillation.

EXAMPLE 7

Figure 14:
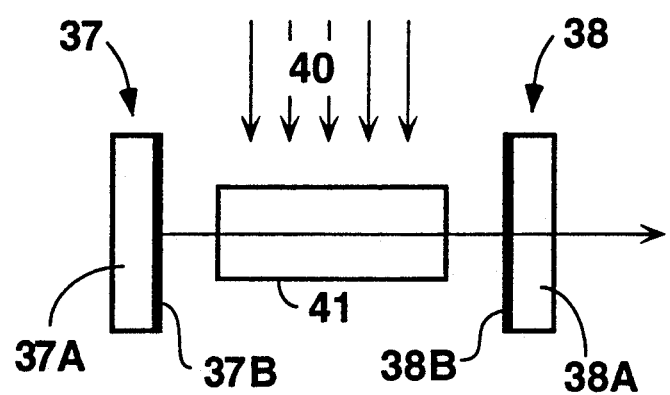
FIG. 14 is a cross section diagram of a solid laser rod resonator in accordance with the present invention.

FIG. 14 shows an example of solid laser construction of the present invention. The solid laser rod 41 is made of a $Nd^{3+}$ doped CLAP-K-Y-La shown in Performanc Example 1. Namely a portion of the $LaF_3$ or $YF_3$ is replaced with $NdF_3$ in the glass formulation and then the melting and casting are carried out. Using a completely similar procedure, the fluoride raw materials are melted. The casting of the melt is carried out by pouring into a hollow cylinder mold to obtain a cylindrical rod measuring 9 mm in diameter and 100 mm in length.

Both ends of the rod are ground-polished to parallel surfaces and the rod is placed into the resonator constructed of the high reflectance mirror 37 and partially transmitting mirror 38 shown in FIG. 14. When the pumping light 40 is irradiated from outside, an extremely stable 1.06 μm laser light is obtained. In addition to $Nd^{3+}$, other transition metal ions may be similarly doped and tested; similarly stable laser oscillations are achieved. For example, the laser oscillations below are achieved: 1.04 μm by $Pr^{3+}$, 2.05 μm by $Ho^{3+}$, 1.6 μm by $Er^{3+}$, 1.9 μm by $Tm^{3+}$, 1.02 by $Yb^{3+}$, 1.1 μm by $Tm^{2+}$, 2.36 μm by $Dy^{2+}$, 1.62 μm by $Ni^{2+}$, 1.7 to 2.05 μm by $Co^{2+}$. The doping amounts of the transition metal ions are those of commonly used methods: for example, 1 to 5 weight %. Depending on the radiation wavelength, instead of CLAP-K-Y-La, other infrared athermal glasses shown in Performance Example 1 can be doped with rare earth ions to construct solid laser rods.

EXAMPLE 8

The $Nd^{3+}$ doped CLAP-K-Y-La solid laser rod described in Example 7 is melted at around 400° C. using a ring heater and spun into fiber having 200 μm in outer diameter and several m in length. By fabricating both edges to Brewster's angle or by similarly arranging oscillation mirrors to its outside, laser oscillation similar to that described in Example 7 may be obtained. In particular, in the case of fiber type laser, the oscillation mode is sensitive to outside disturbances such as temperature change, etc. Hence when the CLAP system athermal glass is employed for the laser fiber matrix glass, output stability is achieved. Instead of the CLAP-K-Y-La, other infrared athermal glasses of the present invention and other transition metal ions can be employed for fiber type laser.

As described above, since the glasses based on the compositions of the present invention have near zero optical path length change due to temperature from 1 μm to 5.3 μm, they are useful in the construction of optical systems which have minimal image flickering (thermal aberration) due to temperature change, i.e., these glasses may be used as object lenses in infrared image tubes, infrared binoculars, etc., where infrared light is directly introduced. In addition, when the glasses of the present invention are introduced into optical systems including lenses passing infrared light, improvements in resolution and stability can be achieved. For example, the principal focus correction optical systems used in infrared microscope, infrared telescope, etc., whose resolutions are greatly affected by temperature variation, can take advantage of the present invention.

Furthermore, when the athermal glasses of the present invention are used for the construction of laser media, or etalons and partial transmitting mirrors in resonators where the temperature changes are severe, lasers having excellent thermal stability at radiation wavelength in the 1 to 5 μm band can be advantageously obtained.

The present invention has been particularly shown and described with reference to the preferred embodiments thereof. However, it will be understood by those skilled in the art that various changes may be made in the form and details of these embodiments without departing from the true spirit and scope of the invention as defined by the following claims.

TABLE 2

Temperature Dependency of Refractive Index and Light Path Length of CLAP Glass

| Wavelength (μm) | Light Source | 23° C. R.I. | 199° C. R.I. | $dn/dT_{rel}$ ($\times 10^{-6}$/°C.) | $dn/dT_{abs}$ ($\times 10^{-6}$/°C.) | $dS/dT_{abs}$ ($\times 10^{-6}$/°C.) |
|---|---|---|---|---|---|---|
| 0.404656 | Hg | 1.62937 | 1.62884 | −3.01 | −4.60 | +6.60 |
| 0.435835 | Hg | 1.62131 | 1.62054 | −4.38 | −5.96 | +5.09 |
| 0.4471 | He | 1.61880 | 1.61797 | −4.72 | −6.30 | +4.71 |
| 0.5015 | He | 1.60987 | 1.60891 | −5.45 | −7.02 | +3.82 |
| 0.546074 | Hg | 1.60486 | 1.60382 | −5.91 | −7.47 | +3.28 |
| 0.576959 | Hg | 1.60198 | 1.60081 | −6.65 | −8.21 | +2.49 |
| 0.587561 | He | 1.60113 | 1.59993 | −6.82 | −8.38 | +2.30 |
| 0.667815 | He | 1.59607 | 1.59478 | −7.33 | −8.88 | +1.71 |
| 0.706519 | He | 1.59428 | 1.59294 | −7.61 | −9.16 | +1.40 |
| 1.01398 | Hg | 1.58627 | 1.58486 | −8.01 | −9.55 | +0.87 |
| 1.08297 | He | 1.58530 | 1.58383 | −8.35 | −9.89 | +0.51 |
| 1.12866 | Hg | 1.58468 | 1.58328 | −7.95 | −9.49 | +0.90 |
| 1.3622 | Hg | 1.58219 | 1.58069 | −8.52 | −10.06 | +0.28 |
| 1.52952 | Hg | 1.58080 | 1.57933 | −8.35 | −9.89 | +0.43 |
| 1.6606 | TCB | 1.57979 | 1.57841 | −7.84 | −9.38 | +0.92 |
| 1.6932 | Hg | 1.57948 | 1.57803 | −8.24 | −9.78 | +0.51 |
| 2.1526 | TCB | 1.57617 | 1.57475 | −8.07 | −9.60 | +0.64 |
| 2.4374 | TCB | 1.57420 | 1.57281 | −7.90 | −9.43 | +0.77 |
| 3.2389 | TCB | 1.56728 | 1.56610 | −6.70 | −8.23 | +1.85 |
| 3.3036 | Poly | 1.56678 | 1.56548 | −7.39 | −8.91 | +1.16 |
| 3.4115 | TCB | 1.56560 | 1.56439 | −6.88 | −8.40 | +1.65 |
| 3.4199 | Poly | 1.56540 | 1.56415 | −7.10 | −8.62 | +1.43 |
| 3.5524 | TCB | 1.56410 | 1.56283 | −7.22 | −8.74 | +1.28 |
| 3.7077 | TCB | 1.56240 | 1.56112 | −7.27 | −8.79 | +1.20 |
| 3.9788 | TCB | 1.55943 | 1.55800 | −8.13 | −9.65 | +0.29 |
| 4.258 | CO2 | 1.55606 | 1.55480 | −7.16 | −8.67 | +1.21 |
| 4.3769 | TCB | 1.55443 | 1.55315 | −7.27 | −8.78 | +1.07 |
| 4.5960 | TCB | 1.55162 | 1.55043 | −6.76 | −8.27 | +1.53 |
| 4.6885 | TCB | 1.55018 | 1.54901 | −6.65 | −8.16 | +1.62 |
| 5.3036 | TCB | 1.54047 | 1.53974 | −4.15 | −5.65 | +3.96 |

TABLE 3

Temperature Dependency of Refractive Index and
Light Path Length of CLAP-K-Y(1) Glass
CLAP-K-Y(1)

| Wavelength ($\mu$m) | Light Source | 23° C. | 199° C. | $dn/dT_{rel}$ ($\times 10^{-6}$/°C.) | $dn/dT_{abs}$ ($\times 10^{-6}$/°C.) | $dS/dT_{abs}$ ($\times 10^{-6}$/°C.) |
|---|---|---|---|---|---|---|
| 0.404656 | Hg | 1.61873 | 1.61853 | −1.13 | −2.69 | +7.87 |
| 0.435835 | Hg | 1.61127 | 1.61091 | −2.04 | −2.68 | +7.75 |
| 0.4471 | He | 1.60907 | 1.60856 | −2.90 | −5.48 | +4.91 |
| 0.5015 | He | 1.60074 | 1.59989 | −4.83 | −6.39 | +3.86 |
| 0.546074 | Hg | 1.59598 | 1.59503 | −5.40 | −6.95 | +3.21 |
| 0.576959 | Hg | 1.59329 | 1.59233 | −5.45 | −7.00 | +3.12 |
| 0.587561 | He | 1.59263 | 1.59141 | −6.93 | −8.48 | +1.62 |
| 0.667815 | He | 1.58792 | 1.58660 | −7.50 | −9.05 | +0.97 |
| 0.706519 | He | 1.58617 | 1.58498 | −6.76 | −8.30 | +1.69 |
| 1.01398 | Hg | 1.57863 | 1.57715 | −8.41 | −9.94 | −0.08 |
| 1.08297 | He | 1.57772 | 1.57631 | −8.01 | −9.55 | +0.293 |
| 1.12866 | Hg | 1.57711 | 1.57562 | −8.47 | −10.01 | −0.178 |
| 1.3622 | Hg | 1.57479 | 1.57327 | −8.64 | −10.17 | −0.378 |
| 1.52952 | Hg | 1.57341 | 1.57194 | −8.35 | −9.88 | −0.111 |
| 1.6606 | TCB | 1.57250 | 1.57114 | −7.73 | −9.26 | +0.495 |
| 1.6932 | Hg | 1.57218 | 1.57070 | −8.41 | −9.94 | −0.192 |
| 2.1526 | TCB | 1.56901 | 1.56767 | −7.61 | −9.14 | +0.555 |
| 2.4374 | TCB | 1.56709 | 1.56572 | −7.78 | −9.31 | +0.352 |
| 3.2389 | TCB | 1.56045 | 1.55915 | −7.39 | −8.91 | +0.640 |
| 3.3036 | Poly | 1.55990 | 1.55841 | −8.46 | −9.98 | −0.442 |
| 3.4115 | TCB | 1.55887 | 1.55750 | −7.78 | −9.30 | +0.222 |
| 3.4199 | Poly | 1.55858 | 1.55713 | −8.24 | −9.76 | −0.244 |
| 3.5524 | TCB | 1.55741 | 1.55595 | −8.30 | −9.82 | −0.324 |
| 3.7077 | TCB | 1.55564 | 1.55431 | −7.56 | −9.08 | +0.388 |
| 3.9788 | TCB | 1.55267 | 1.55130 | −7.78 | −9.29 | +0.126 |
| 4.258 | CO2 | 1.54951 | 1.55800 | −8.58 | −10.09 | −0.559 |
| 4.3769 | TCB | 1.54808 | 1.54664 | −8.18 | −9.69 | −0.353 |
| 4.5960 | TCB | 1.54516 | 1.54382 | −7.61 | −9.11 | +0.178 |
| 4.6885 | TCB | 1.54386 | 1.54225 | −7.44 | −8.94 | +0.326 |
| 5.3036 | TCB | 1.53458 | 1.53323 | −7.67 | −9.16 | −0.052 |

TABLE 4

Temperature Dependency of Refractive Index and
Light Path Length of CLAP-K-Y(2) Glass
CLAP-K-Y(2)

| Wavelength ($\mu$m) | Light Source | 18° C. | 198° C. | $dn/dT_{rel}$ ($\times 10^{-6}$/°C.) | $dn/dT_{abs}$ ($10^{-6}$/°C.) | $dS/dT_{abs}$ ($\times 10^{-6}$/°C.) |
|---|---|---|---|---|---|---|
| 0.404656 | Hg | 1.62293 | 1.62234 | −3.28 | −4.86 | +5.75 |
| 0.435835 | Hg | 1.61539 | 1.61452 | −4.83 | −6.40 | +4.07 |
| 0.4471 | He | 1.61306 | 1.61218 | −4.89 | −6.46 | +3.97 |
| 0.5015 | He | 1.60465 | 1.60368 | −5.39 | −6.95 | +3.34 |
| 0.546074 | Hg | 1.59987 | 1.59880 | −5.90 | −7.46 | +2.74 |
| 0.576959 | Hg | 1.59717 | 1.59600 | −6.50 | −8.05 | +2.10 |
| 0.587561 | He | 1.59637 | 1.59524 | −6.28 | −7.83 | +2.31 |
| 0.667815 | He | 1.59156 | 1.59036 | −6.67 | −8.22 | +1.84 |
| 0.706519 | He | 1.58978 | 1.58848 | −7.22 | −8.77 | +1.26 |
| 1.01398 | Hg | 1.58217 | 1.58084 | −7.39 | −8.93 | +0.97 |
| 1.08297 | He | 1.58122 | 1.57980 | −7.89 | −9.43 | +0.45 |
| 1.12866 | Hg | 1.58062 | 1.57928 | −7.44 | −8.98 | +0.89 |
| 1.3622 | Hg | 1.57829 | 1.57688 | −7.83 | −9.37 | +0.746 |
| 1.52952 | Hg | 1.57698 | 1.57553 | −8.06 | −9.59 | +0.22 |
| 1.6606 | TCB | 1.57604 | 1.57482 | −6.78 | −8.31 | +1.48 |
| 1.6932 | Hg | 1.57571 | 1.57434 | −7.61 | −9.14 | +0.65 |
| 2.1526 | TCB | 1.57263 | 1.57130 | −7.39 | −8.92 | +0.81 |
| 2.4374 | TCB | 1.57077 | 1.56949 | −7.11 | −8.64 | +1.06 |
| 3.2389 | TCB | 1.56428 | 1.56305 | −6.83 | −8.35 | +1.24 |
| 3.3036 | Poly | 1.56376 | 1.56241 | −7.50 | −9.02 | +0.56 |
| 3.4115 | TCB | 1.56279 | 1.56151 | −7.11 | −8.63 | +0.94 |
| 3.4199 | Poly | 1.56243 | 1.56119 | −6.89 | −8.41 | +1.15 |
| 3.5524 | TCB | 1.56123 | 1.56012 | −6.17 | −7.69 | +1.85 |
| 3.7077 | TCB | 1.55951 | 1.55827 | −6.89 | −8.41 | +1.10 |
| 3.9788 | TCB | 1.55666 | 1.55546 | −6.67 | −8.18 | +1.29 |
| 4.258 | CO2 | 1.55343 | 1.55237 | −5.89 | −7.40 | +2.01 |
| 4.3769 | TCB | 1.55226 | 1.55104 | −6.78 | −8.29 | +1.10 |
| 4.5960 | TCB | 1.54939 | 1.54833 | −5.89 | −7.40 | +1.94 |
| 4.6885 | TCB | 1.54812 | 1.54693 | −6.61 | −8.12 | +1.20 |
| 5.3036 | TCB | 1.53925 | 1.53822 | −5.72 | −7.22 | +1.95 |

TABLE 5

Temperature Dependency of Refractive Index and Light Path Length of CLAP-K-Y-La Glass CLAP-K-Y-La

| Wavelength ($\mu$m) | Light Source | 20° C. | 200° C. | $dn/dT_{rel}$ ($\times 10^{-6}$/°C.) | $dn/dT_{abs}$ ($\times 10^{-6}$/°C.) | $dS/dT_{abs}$ ($\times 10^{-6}$/°C.) |
|---|---|---|---|---|---|---|
| 0.404656 | Hg | 1.62229 | 1.62173 | −3.11 | −4.69 | +6.32 |
| 0.435835 | Hg | 1.61465 | 1.61384 | −4.5 | −6.07 | +4.80 |
| 0.4471 | He | 1.61202 | 1.61105 | −5.39 | −6.96 | +3.86 |
| 0.5015 | He | 1.60352 | 1.60256 | −5.33 | −6.89 | +3.78 |
| 0.546074 | Hg | 1.59892 | 1.59784 | −6.00 | −7.56 | +3.03 |
| 0.576959 | Hg | 1.59611 | 1.59513 | −5.44 | −6.99 | +3.55 |
| 0.587561 | He | 1.59536 | 1.59434 | −5.67 | −7.22 | +3.31 |
| 0.667815 | He | 1.59051 | 1.58947 | −5.78 | −6.06 | +3.11 |
| 0.706519 | He | 1.58876 | 1.58767 | −6.06 | −7.61 | +2.80 |
| 1.01398 | Hg | 1.58104 | 1.57982 | −6.78 | −8.31 | +1.96 |
| 1.08297 | He | 1.58014 | 1.57896 | −6.56 | −8.10 | +2.15 |
| 1.12866 | Hg | 1.57949 | 1.57822 | −7.06 | −8.60 | +1.64 |
| 1.3622 | Hg | 1.57707 | 1.57593 | −6.33 | −7.86 | +2.34 |
| 1.52952 | Hg | 1.57579 | 1.57460 | −6.61 | −8.14 | +2.04 |
| 1.6606 | TCB | 1.57495 | 1.57365 | −7.22 | −8.75 | +1.41 |
| 1.6932 | Hg | 1.57451 | 1.57328 | −6.83 | −8.36 | +1.79 |
| 2.1526 | TCB | 1.57152 | 1.57011 | −7.83 | −9.36 | +0.74 |
| 2.4374 | TCB | 1.56967 | 1.56828 | −7.72 | −9.25 | +0.81 |
| 3.2389 | TCB | 1.56319 | 1.56175 | −8.00 | −9.52 | +0.43 |
| 3.3036 | Poly | 1.56265 | 1.56128 | −7.61 | −9.13 | +0.81 |
| 3.4115 | TCB | 1.56151 | 1.56027 | −6.87 | −8.39 | +1.53 |
| 3.4199 | Poly | 1.56139 | 1.56002 | −7.61 | −9.13 | −0.79 |
| 3.5524 | TCB | 1.56016 | 1.55883 | −7.39 | −8.91 | +0.99 |
| 3.7077 | TCB | 1.55852 | 1.55709 | −7.94 | −9.46 | +0.41 |
| 3.9788 | TCB | 1.55561 | 1.55421 | −7.78 | −9.29 | +0.53 |
| 4.258 | CO2 | 1.55242 | 1.55111 | −7.28 | −8.79 | +0.97 |
| 4.3769 | TCB | 1.55128 | 1.54982 | −8.11 | −9.62 | +0.12 |
| 4.5960 | TCB | 1.54833 | 1.54697 | −7.56 | −9.07 | +0.62 |
| 4.6885 | TCB | 1.54705 | 1.54581 | −6.89 | −8.40 | +1.26 |
| 5.3036 | TCB | 1.53831 | 1.53712 | −6.61 | −8.10 | +1.41 |

We claim:

1. An athermal lens composed of a glass composition comprising about 0-13 mol % CdO, 9-24 mol % CdF$_2$, 5-10 mol % LiF, 30-34.5 mol % AlF$_3$, 28-33.5 mol % PbF$_2$, 0-4 mol % KF, 0-6.5 mol % YF$_3$, and 0-2 mol % LaF$_3$.

2. An athermal solid glass medium capable of lasing embodying a glass composition comprising about 0-13 mol % CdO, 9-24 mol % CdF$_2$, 5-10 mol % LiF, 30-34.5 mol % AlF$_3$, 28-33.5 mol % PbF$_2$, 0-4 mol % KF, 0-6.5 mol % YF$_3$, and 0-2 mol % LaF$_3$.

3. An athermal glass fiber capable of lasing wherein the core of said fiber is formed of a glass composition comprising about 0-13 mol % CdO, 9-24 mol % CdF$_2$, 5-10 mol % LiF, 30-34.5 mol % AlF$_3$, 28-33.5 mol % PbF$_2$, 0-4 mol % KF, 0-6.5 mol % YF$_3$, and 0-2 mol % LaF$_3$ along with a rare earth dopant selected to enable laser emission at a pre-selected emission wavelength.

4. An athermal glass fiber capable of lasing wherein the clading of said fiber is formed of a glass composition comprising about 0-13 mol % CdO, 9-24 mol % CdF$_2$, 5-10 mol % LiF, 30-34.5 mol % AlF$_3$, 28-33.5 mol % PbF$_2$, 0-4 mol5 KF, 0-6.5 mol % YF$_3$, and 0-2 mol % LaF$_3$ along with a rear earth dopant selected to enable laser emission at a pre-selected emission wavelength.

* * * * *

UNITED STATES PATENT AND TRADEMARK OFFICE
CERTIFICATE OF CORRECTION

PATENT NO. : 5,278,107
DATED : January 11, 1994
INVENTOR(S) : Paul A. Tick and Seiko Mitachi It is certified that error appears in the above-indentified patent and that said Letters Patent is hereby corrected as shown below:

Col. 12, line 42 "mol5" should read -- mol% --.

Col. 12, line 43 "rear" should -- rare --.

Signed and Sealed this

Thirteenth Day of September, 1994

Attest:

BRUCE LEHMAN

Attesting Officer

Commissioner of Patents and Trademarks